(12) United States Patent
Kondo et al.

(10) Patent No.: US 6,502,179 B2
(45) Date of Patent: Dec. 31, 2002

(54) METHOD AND APPARATUS FOR COMPACTLY STORING INSTRUCTION CODES

(75) Inventors: Teruyoshi Kondo, Kasugai (JP); Masayuki Takeshige, Kasugai (JP); Sumitaka Hibino, Kasugai (JP); Hayato Isobe, Kasugai (JP); Yukisato Miyazaki, Kasugai (JP); Kunihiro Ohara, Kasugai (JP); Kazuya Taniguchi, Kasugai (JP); Hiroshi Naritomi, Kasugai (JP)

(73) Assignee: Fujitsu Limited, Kawasaki (JP)

( * ) Notice: Subject to any disclaimer, the term of this patent is extended or adjusted under 35 U.S.C. 154(b) by 141 days.

(21) Appl. No.: 09/768,363

(22) Filed: Jan. 25, 2001

(65) Prior Publication Data
US 2002/0023205 A1 Feb. 21, 2002

(30) Foreign Application Priority Data
Aug. 18, 2000 (JP) ........................................ 2000-248431

(51) Int. Cl.$^7$ .............................................. G06F 12/04
(52) U.S. Cl. ........................ 711/214; 711/173; 711/201; 712/204; 712/205
(58) Field of Search .......................... 707/101; 711/201, 711/173, 149, 214; 712/204, 205, 300

(56) References Cited

U.S. PATENT DOCUMENTS

| 4,454,578 | A | * | 6/1984 | Matsumoto et al. | ......... 711/201 |
| 5,930,508 | A | * | 7/1999 | Faraboschi et al. | ......... 712/204 |
| 6,134,640 | A | * | 10/2000 | Unno et al. | ................. 711/103 |
| 6,178,491 | B1 | * | 1/2001 | Ben-Ephraim et al. | ..... 711/129 |

* cited by examiner

Primary Examiner—Do Hyun Yoo
Assistant Examiner—Paul Baker
(74) Attorney, Agent, or Firm—Staas & Halsey LLP

(57) ABSTRACT

A processor for performing calculations based on an instruction code, the number of bits of which is not an integer multiple of a byte. The instruction code is divided into higher order bits and lower order bits. The number of the lower order bits is an integer multiple of one byte. A memory stores the lower order bits in a lower order bit storage section and the higher order bits in a higher order bit storage section. The lower order bits and the corresponding higher order bits are read from the memory in the same cycle when generating the instruction code.

17 Claims, 5 Drawing Sheets

METHOD AND APPARATUS FOR COMPACTLY STORING INSTRUCTION CODES

BACKGROUND OF THE INVENTION

The present invention relates to a processor, and more particularly, to a processor for reading instruction codes that are stored in a memory to perform calculations in accordance with the instruction codes.

There are recent processors that perform calculations based on instruction codes having a bit length that is not an integer multiple of one byte. Such a processor functions as described below.

When, for example, storing an instruction code having 18 bits in a memory section configured by a plurality of 16 bit-length sectors, the processor stores 16 bits of the instruction code in a sector located at a first address. The 16 bits are stored during a first write cycle. The processor then stores the remaining 2 bits in a sector located at a second address during a second write cycle. The cycles are in accordance with clock signals.

To store another 18-bit instruction code, the processor stores 16 bits of the instruction code in a sector located at a third address during a third write cycle. The processor then stores the remaining 2 bits in a sector located at a fourth address during a fourth write cycle.

When reading the stored instruction codes, the processor reads 16 bits of an instruction code from the sector located at the first address during a first read cycle, and reads the remaining two bits from the sector located at the second address during a second read cycle. The processor synthesizes the 16-bit and 2-bit instruction codes to generate an 18-bit instruction code and perform a calculation in accordance with the instruction code.

In such processor, each of the sectors storing 2 bits of instruction code has a vacant area of 14 bits. Therefore, the storage of a plurality of instruction codes in a plurality of sectors increases the number of vacant areas and decreases the data storage efficiency. This increases the required memory capacity.

Further, two clock signal transmission cycles are necessary to write or read an 18-bit instruction code. This limits the calculating speed.

SUMMARY OF THE INVENTION

It is an object of the present invention to provide a processor and a information processing method that efficiently stores instruction codes in a memory and decreases the time for transmitting instruction codes.

To achieve the above object, the present invention provides a processor for performing calculations based on a plurality of instruction codes. Each of the instruction codes includes a higher order bit and lower order bits. The number of lower order bits is an integer multiple of one byte. The processor includes a memory for storing the instruction codes. The memory includes a lower order bit storage section, for storing the lower order bits of each of the instruction codes, and a higher order bit storage section, for storing the higher order bit of each of the instruction codes. An instruction code generation circuit is connected to the memory. The instruction code generation circuit receives a first address signal including data corresponding to an address of the memory, reads the lower order bits and the higher order bit of the instruction code located at the address corresponding to the first address signal, and generates the instruction code. An arithmetic unit is connected to the instruction code generation circuit to provide the first address signal to the instruction code generation circuit, to receive the instruction code generated by the instruction code generation circuit, and to perform a predetermined calculation.

The present invention also provides a processor for performing calculations based on a plurality of instruction codes. Each of the instruction codes includes a higher order bit and lower order bits. The number of lower order bits is an integer multiple of one byte. The processor includes a memory for storing the instruction codes. The memory includes a lower order bit storage section, for storing the lower order bits of each of the instruction codes, and a higher order bit storage section, for storing the higher order bits of more than one of the instruction codes at the same address.

The present invention further provides a information processing method for performing calculations based on a plurality of instruction codes. Each of the instruction codes includes a higher order bit and lower order bits. The number of lower order bits is an integer multiple of one byte. The method includes storing the lower order bits of each of the instruction codes in a lower order bit storage section of a memory at a plurality of addresses, storing the higher order bit of more than one of the instruction codes in a higher order bit storage section of the memory at a single address, generating an instruction code in response to an address signal indicating an address of the memory by reading the lower order bits of a predetermined one of the instruction codes and the corresponding higher order bit in the same cycle, and performing a calculation in accordance with the instruction code.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
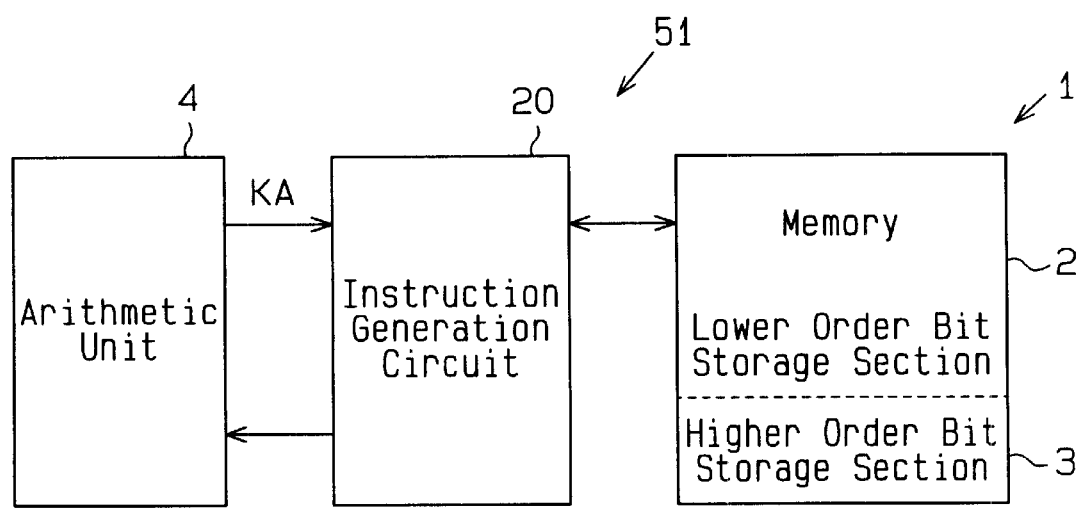
FIG. 1 is a schematic block diagram of a processor according to a first embodiment of the present invention.

In the drawings, like numerals are used for like elements throughout.

[First Embodiment]

FIG. 1 is a schematic block diagram of a processor 51 according to a first embodiment of the present invention. The processor 51 includes a memory 1, an arithmetic unit 4, and an instruction code generation circuit 20. Further, the processor 51 reads instruction codes having bit lengths that are not integer multiples of one byte and performs calculations. Each instruction code has lower order bits, the number of which is an integer multiple of one byte, and higher order bits.

The memory 1 has a lower order bit storage section 2 and a higher order bit storage section 3, which successively stores the higher order bits of the instruction codes.

The instruction code generation circuit 20 reads the lower order bits and the higher order bits of an instruction code from a memory 1 during the same cycle when receiving a first address signal KA received from the arithmetic unit 4.

In addition to providing the instruction code generation circuit 20 with the first address signal KA, the arithmetic unit 4 performs calculations in accordance with instruction codes received from the instruction code generation circuit 20.

[Second Embodiment]

Figure 2:
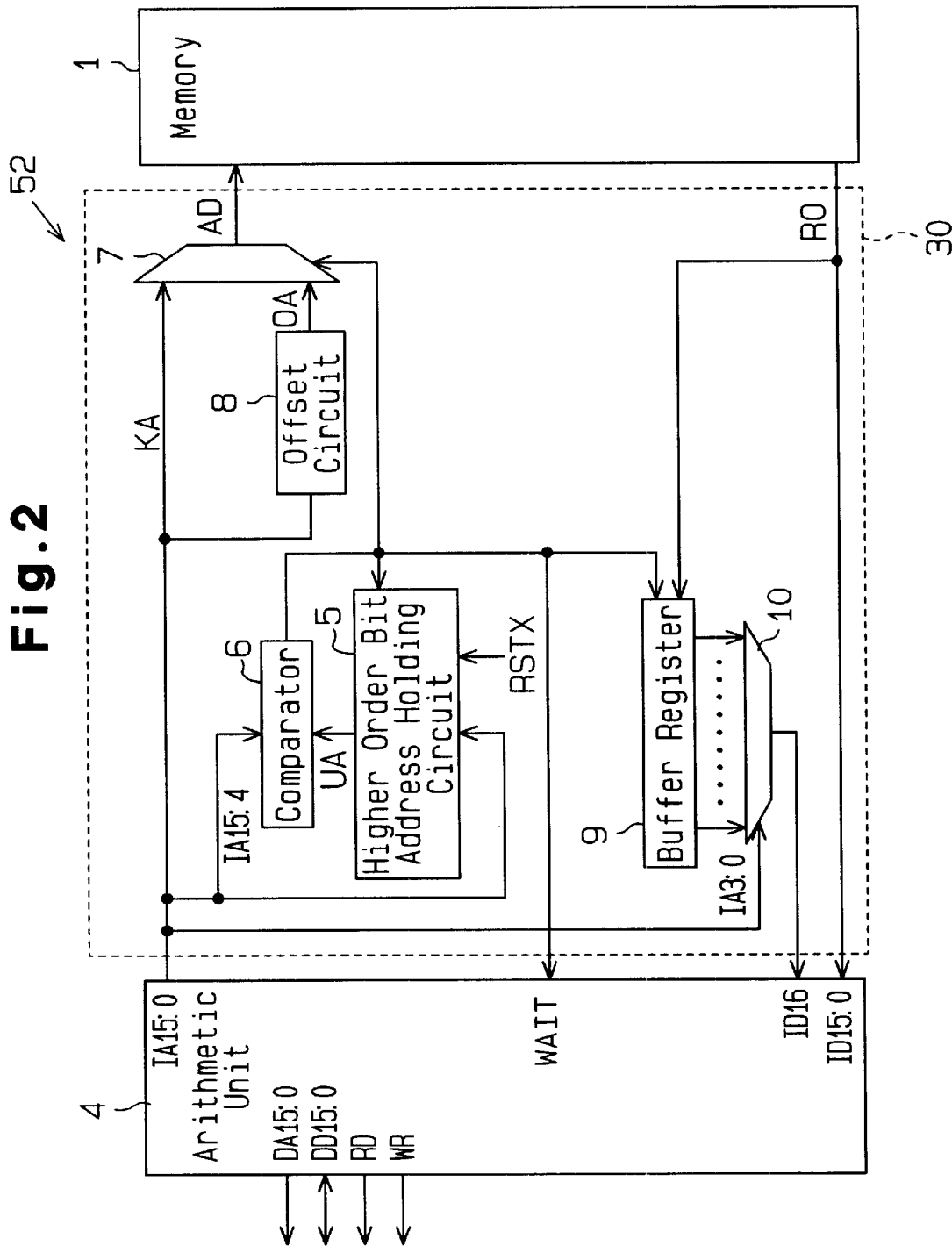
FIG. 2 is a schematic block diagram of a processor according to a second embodiment of the present invention.

FIG. 2 is a schematic block diagram of a processor 52 according to a second embodiment of the present invention. The processor 52 includes a memory 1, an arithmetic unit 4, and an instruction code generation circuit 30. In the second embodiment, each instruction code has lower order bits, the number of which is an integer multiple of one byte, and a higher order bit.

The memory 1 is a single port memory configured by a plurality of sectors. Sixteen bits, or two bytes, of data are stored at each address of the memory. The memory 1 stores a plurality of memory codes having lengths of n bits (17 bits in the second embodiment). The memory codes are received from an external CPU.

Figure 3:
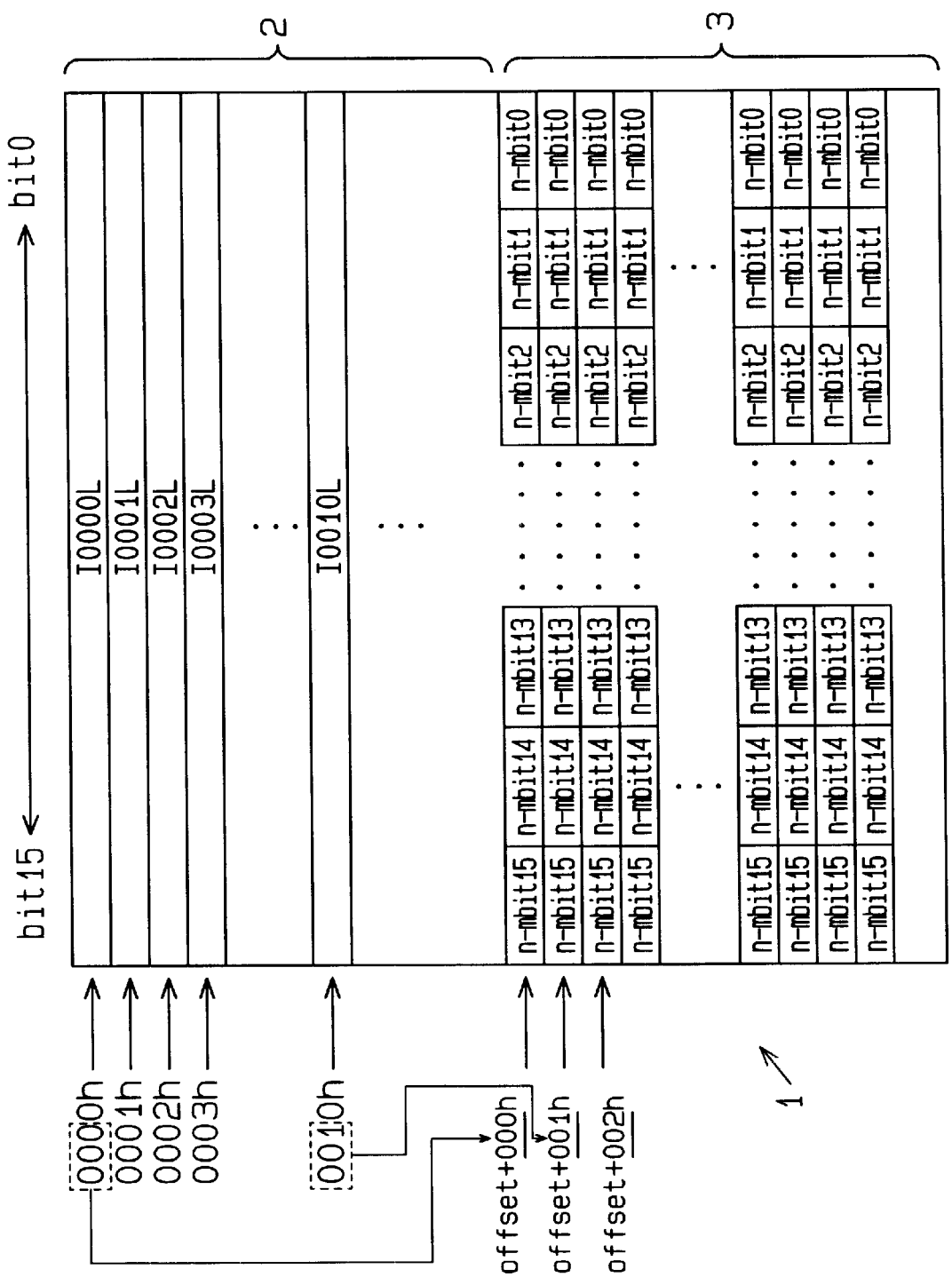
FIG. 3 is an explanatory diagram of a memory of the processor of FIG. 2.

FIG. 3 is an explanatory diagram of the memory 1 of the processor 52. The memory 1 is divided into a lower order bit storage section 2 and a higher order bit storage section 3.

Each sector, which is assigned with an address, of the lower order bit storage section 2 stores data corresponding to an m number (in the second embodiment, 16) of lower order bits of an instruction code.

Each sector, which is assigned with an address, of the higher order bit storage section 3 stores data corresponding to an n−m number of higher order bits of an instruction code. In the second embodiment, the higher order bit storage section 3 stores the data of the highest order bit of 16 instruction codes at each address.

To read the instruction codes stored in the memory 1, the arithmetic unit 4 outputs a first address signal KA. The first address signal KA includes address data IA having 16 bits (bits 15 to 0). Among the 16 bits of the address data IA, the arithmetic unit 4 provides 12 higher order bits (bits 15 to 4) to a higher order bit address holding circuit 5 and a comparator 6. Bits 15 to 0 represent the data of the 16 bits between the lowest and highest order bits. Bits 15 to 4 represent the data of the 12 bits between the fifth and highest order bit.

The instruction code generation circuit 30 includes the higher order bit address holding circuit 5, the comparator 6, a first selector (address signal shifting circuit) 7, an offset circuit 8, a buffer register 9, and a second selector 10.

The higher order bit address holding circuit 5 holds the 12 higher order bits (bits 15 to 4) of the address data IA and provides the comparator 6 with a higher order bit address signal UA, which includes the address data IA (bits 15 to 4). When the processor 52 is activated, the higher order bit address holding circuit 5 is provided with a reset signal RESTX having a low logic level. This resets the holding data to 111h (h referring to a hexadecimal).

The comparator 6 compares the address data IA (bits 15 to 4) provided from the arithmetic unit 4 with the address data IA (bits 15 to 4) provided from the higher order holding circuit 5 and generates a comparison signal HIT, which has a high logic level, when the two pieces of data match.

The comparison signal HIT is sent to the higher order bit address holding circuit 5. When the comparison signal HIT is low, the higher order bit address holding circuit 5 holds the address data IA (bits 15 to 4).

The arithmetic unit 4 provides the address data IA (bits 15 to 0) to the first selector 7 and the offset circuit 8. The offset circuit 8 generates addresses of the higher order bit storage section 3 in correspondence with the addresses of the lower order bit storage section 2. Referring to FIG. 3, if, for example, the address data IA (bits 15 to 0) corresponds to address 0000h, the offset circuit 8 generates a higher order bit storage section address of the sector storing the higher order (n−m) bit by adding 000h to a predetermined offset address value OFFSET. In the processor 52, the higher order bit storage section 3 stores at address OFFSET+000h the data of the highest order bit of the 16 instruction codes stored in the lower order bit storage section 2 at addresses 0000h to 000fh. The offset circuit 8 provides the offset address signal OA, which includes the higher order bit storage section address.

In the same manner, when the address data IA (bits 15 to 0) corresponds to 0010h, the offset circuit 8 generates the address of the sector in which the higher order (n−m) bit of the instruction code is stored by adding 001h to the predetermined offset value OFFSET. The higher order bit storage section 3 stores at address OFFSET+001h the data of the highest order bits of the 16 instruction codes stored in the lower order bit storage section 2 at addresses 0010h to 001fh.

When the comparison signal HIT goes high, the first selector 7 provides the first address signal KA as a second address signal AD to the memory 1. Further, when the comparison signal HIT goes low, the offset circuit 8 provides the offset address signal OA as the second address signal AD to the memory 1.

When the memory 1 is provided with the first address signal KA, which indicates an address in the lower order bit storage section 2, the 16 lower order bits of an instruction code stored at the designated address are read as read data RO. The read data RO is then provided to the arithmetic unit 4 as 16 bits of lower order bit data ID (bits 15 to 0).

When the memory 1 receives the offset address signal OA, the higher order bit data of the 16 bits of the instruction code stored at the address of the higher order bit storage section 3, which is designated by the address signal OA, is read as the read data RO. The read data RO of the higher order bits is provided to the buffer register 9.

When the comparison signal HIT goes high, the buffer register 9 latches the higher order bit data of the 16 bits of the instruction codes received from the memory 1 and provides the higher order bit data to the second selector 10.

The second selector 10 receives the four lower order bits of the address data IA (bits 3 to 0) from the arithmetic unit 4. From the higher order bit data of the 16 bits, the second selector 10 selects one bit, which corresponds with the address data IA (bits 3 to 0), and provides the selected higher order bit data ID16 to the arithmetic unit 4.

The comparison signal HIT is provided to the arithmetic unit 4 as a standby signal WAIT. When the standby signal WAIT goes low, the arithmetic unit 4 enters a standby state and outputs the same address data IA (bit 15 to 0).

Figure 4:
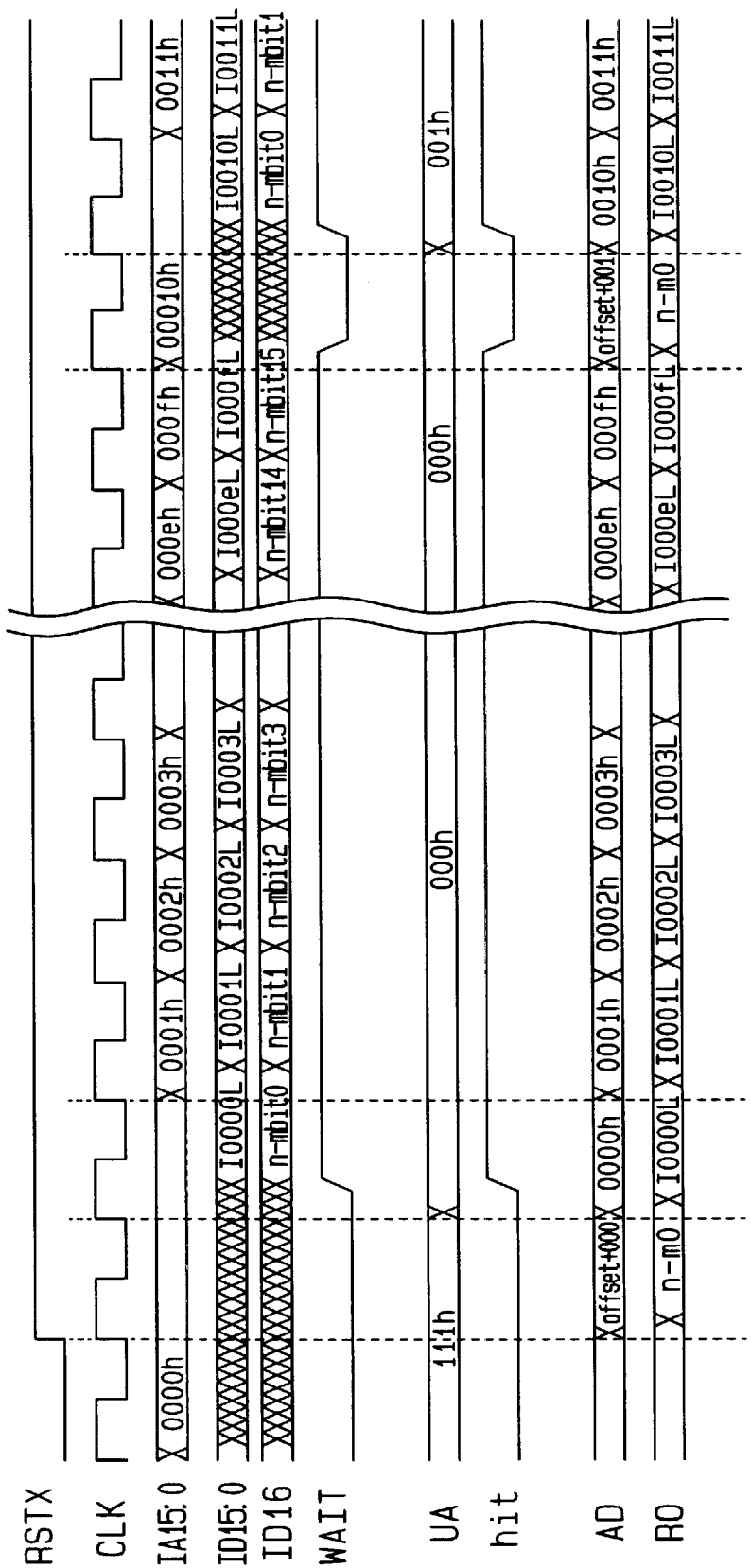
FIG. 4 is a combined timing and waveform diagram illustrating the operation of the processor of FIG. 2.

The operation of the processor 52 will now be discussed. FIG. 4 is a combined timing and waveform chart illustrating the operation of the processor 52. The arithmetic unit 4, the higher order bit address holding circuit 5, and the memory 1 are operated in accordance with a common clock signal.

When the processor 52 is activated, the higher order bit address holding circuit 5 is initialized to the data of 111h by the low reset signal RSTX.

Then, when the reset signal RSTX goes high and releases the higher order bit address holding circuit 5 from the reset state, the arithmetic unit 4 outputs the address signal KA, which includes data representing address 0000h.

The comparator 6 compares the address data IA (bits 15 to 4), or 000h, with data 111h, which is stored in the higher order bit address holding circuit 5. Since the two pieces of data are not matched, the comparison signal HIT is low.

In this state, the standby signal WAIT is also low and maintains the address data IA output from the arithmetic unit 4 at 0000h. Further, in response to the low comparison signal HIT, the first selector 7 provides the offset address signal OA as the address signal AD to the memory 1. The address signal AD includes data representing address OFFSET+000h.

Then, the high order bit data of the 16 bits stored at address OFFSET+000h is read from the memory 1, and the high order bit data is stored in the buffer register 9 since the comparison signal HIT is low. The high order bit data is provided to the second selector 10.

The second selector 10 selects the data stored in bit 0 (n–m) from the high order bit data of the 16 bits in accordance with the data IA of the four lower order bits (bits 3 to 0). The selected high order bit data ID16 is provided to the arithmetic unit 4.

However, in this state, the standby signal WAIT is low. Thus, the arithmetic unit 4 does not recognize the high order bit data ID16 and the low order bit data ID (bits 15 to 0).

Next, if the clock signal CLK goes high when the comparison signal HIT is low, the arithmetic unit 4 provides the address data IA (bits 15 to 4) of 000h to the high order bit address holding circuit 5. In this state, the data of 000h stored in the high order bit address holding circuit 5 matches the 12 higher order bits of the address data 000h provided to the comparator 6 from the arithmetic unit 4. Thus, the comparison signal HIT goes high.

The address data of 0000h is provided to the memory 1 from the first selector 7. Based on the address data, the lower order bit data I0000L of an instruction code is read from the memory 1. The lower order bit data I0000L is provided to the arithmetic unit 4 as the lower order bit data ID (bits 15 to 0) of the 16 bits.

Further, since the comparison signal HIT is high, the stored data in the buffer register 9 does not change. Based on the lower order bits 0000 of the address data provided from the arithmetic unit 4, the second selector 10 selects the higher order bit data of (n–m) bit 0 from the higher order bit data stored in the buffer register 9. The higher order bit data of (n–m) bit 0 is provided to the arithmetic unit 4 as the higher order bit data ID16.

The arithmetic unit 4 synthesizes the lower order bit data ID of 16 bits (bits 15 to 0), which is I0000L, and the higher order bit data ID16 of one bit, which is bit 0, to generate a 17-bit instruction code.

Then, when the clock signal CLK goes high, the arithmetic unit 4 outputs the address data IA (bits 15 to 0), which is 0001h. In this state, the data of the 12 higher order bits of the comparator 6, which is 000h, matches the stored data of the high order bit address holding circuit 5 and maintains the comparison signal HIT at a high level.

The first selector 7 provides the memory 1 with the address data 0001h. Based on the address data, the lower order bit data I0001L of the instruction code is read from the memory 1. The lower order bit data of I0001L is provided to the arithmetic unit 4 as lower order bit data ID15–0, which has 16 bits.

Since the comparison signal HIT is high, the stored data of the buffer register 9 does not change. Based on the four lower order bits of the address data 0001 provided from the arithmetic unit 4, the second selector 10 selects the data of (n–m) bit 1 from the higher order bit data of the 16 bits. The data (n–m) bit 1 is provided to the arithmetic unit 4 as higher order bit data ID16. The arithmetic unit 4 synthesizes the lower order bit data of the 16 bits, which is I0001L, and the high order bit data of one bit, which is (n–m) bit 1, to generate a 17-bit instruction code. This process is repeated until the arithmetic unit 4 outputs the address data of 000fh.

Then, when the arithmetic unit 4 outputs the address data 0010h, the data 000h stored in the address holding circuit 5 and the address data of the higher order 12 bits, which is 001h and which is provided from the arithmetic unit 4 to the comparator 6, are not matched. Thus, the comparison signal HIT goes low.

In this state, the offset address signal OA, which includes the address data OFFSET+001h is provided from the first selector 7 to the memory 1.

In accordance with the address data OFFSET+001h, the higher order bit data of the 16 bits stored in the memory 1 at address OFFSET+001h is read. Since the comparison signal HIT is low, the higher order bit data is stored in the buffer register 9 and provided to the second selector 10.

The second selector 10 selects the data (n–m) bit 0 in accordance with the four lower order bits 0000 at address 0010h from the higher order bit data. The data (n–m) bit 0 is provided to the arithmetic unit 4 as the higher order bit data ID16.

In this state, the standby signal WAIT is low. Thus, the arithmetic unit 4 does not recognize the higher order bit data ID16 and the lower order bit data ID (bits 15 to 0).

Then, if the clock signal CLK goes high when the comparison signal HIT is low, the higher order bit address holding circuit 5 stores data 001h of the 12 higher order bits of the address data 0010h.

Since the stored data 001h of the high order bit address holding circuit 5 matches the data 001h provided to the comparator 6, the comparison signal HIT goes high again.

In this state, the first selector 7 provides the memory 1 with the address signal KA, which includes the address data 0010h. The lower order bit data I0010L of the instruction code is read from the memory 1 in accordance with the address data 0010h. The lower order bit data I0010L is provided to the arithmetic unit 4 as the 16 bit lower order bit data ID (bits 15 to 0).

Since the comparison signal HIT is high, the data of the buffer register 9 does not change. In accordance with the four lower order bits 0000 of the address data 0010h, the second selector 10 selects the higher order bit data (n–m) bit 0 from the 16 bits of the high order bit data. The high order bit data (n–M) bit 0 is provided to the arithmetic unit 4 as the high order bit data ID16.

The arithmetic unit 4 synthesizes the 16 bit low order bit data ID (bits 15 to 0), which is I0010L, and the 1 bit high order bit data ID16 to generate a 17-bit instruction code.

In the same manner, until the arithmetic unit 4 receives the address data 001fh, the arithmetic unit 4 synthesizes the 16 bit low order bit data ID (bits 15 to 0), which is read from the low bit storage section 2, and the single bit high order bit data ID16, which is read from the buffer register 9, to generate a 17-bit instruction code.

Then, when the arithmetic unit 4 outputs the address data 0020h, the data provided to the comparator 6 do not match. Thus, the comparison signal HIT goes low again. This rewrites the data of the high order bit data ID16 stored in the buffer register 9. Subsequently, the reading and synthesizing of instruction codes are repeated in the same manner. The arithmetic unit 4 performs a predetermined calculation in accordance with each synthesized instruction code.

The processor 52 of the second embodiment has the advantages described below.

(1) 17-bit length instruction codes, the number of bits of which is not an integer multiple of one byte, are each divided into 16 lower order bits, the number of which is an integer multiple of one byte, and one high order bit. The 16 lower order bits of the instruction codes are stored in the lower order bit storage section 2. The single high order bits of the instructions codes are successively stored in the high order bit section 3. Thus, the instruction codes are stored in the memory 1 without forming vacant areas. This allows the capacity of the memory 1 to be decreased.

(2) In 17 clock signal CLK cycles except for one cycle, a 17-bit instruction code is read during each cycle.

This increases the transmission speed of the instruction codes from the memory 1 to the arithmetic unit 4.

(3) Instruction codes having lengths that are not an integer multiple of one byte are stored in a memory, which bit length is an integer multiple of one byte. Thus, the memory 1 may be used as a general-purpose memory. This reduces the cost of the processor 52.

[Third Embodiment]

Figure 5:
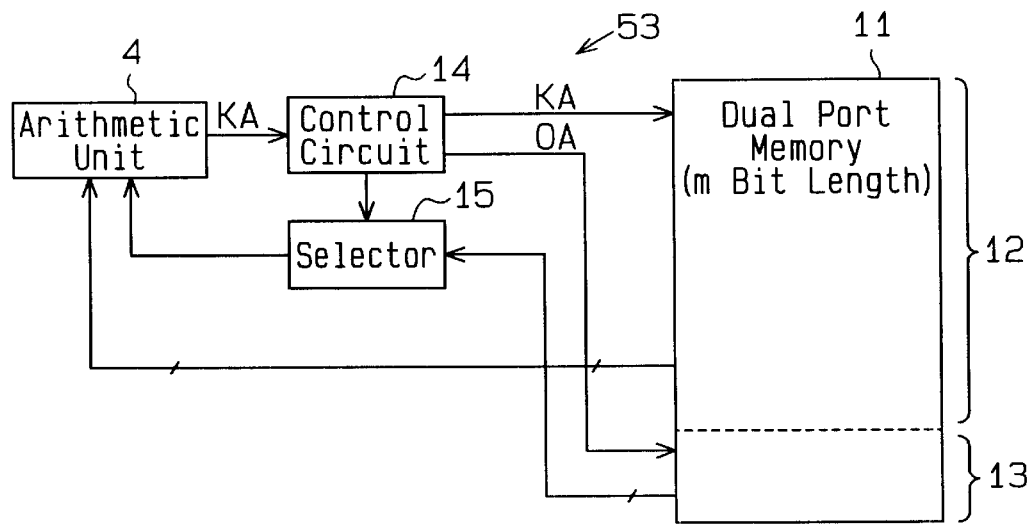
FIG. 5 is a schematic block diagram of a processor according to third embodiment of the present invention.

FIG. 5 is a schematic block diagram of a processor 53 according to a third embodiment of the present invention. The processor 53 includes an arithmetic unit 4, a control circuit 14, a memory 11, and a selector 15.

The memory 11 is a dual-port memory. When an instruction code has a bit-length that is not an integer multiple of one byte, the low order bits, the number of which is an integer multiple of one byte, are stored in a low order bit storage section 12 and the remaining higher order bits are stored in a higher order bit storage section 13 without forming vacant areas in the higher order bit storage section 13.

The arithmetic unit 4 provides the control circuit 14 with the first address signal KA. The control circuit 14 provides the lower order bit storage section 12 with the address signal KA and provides in parallel the high order storage section 13 with an offset address signal OA, which is similar to the address signal generated by the offset circuit 8 of the second embodiment.

The low order bit data read from the low order bit storage section 12 is provided to the arithmetic unit 4, and the high order bit data read from the high order bit storage section 13 is provided to the selector 15.

In accordance with the lower order bit address signal provided from the control circuit 14, the selector 15 selects the higher order bit data corresponding to the lower order bit data read from the low order bit storage section 12. The selector 15 then provides the arithmetic unit 4 with the selected higher order bit data.

The arithmetic unit 4 synthesizes the provided lower order bit data and the higher order bit data to generate an instruction code. Then, the arithmetic unit 4 performs a calculation in accordance with the instruction code.

The processor 53 of the third embodiment has the advantages described below.

(1) By using a dual-port memory as the memory 11, the lower order bit storage section 12 and the high order bit storage section 13 are accessed in parallel. This allows instruction codes to be read in every clock signal cycle.

Accordingly, the speed for transmitting instruction codes from the memory 11 to the arithmetic unit 4 is further increased.

[Fourth Embodiment]

Figure 6:
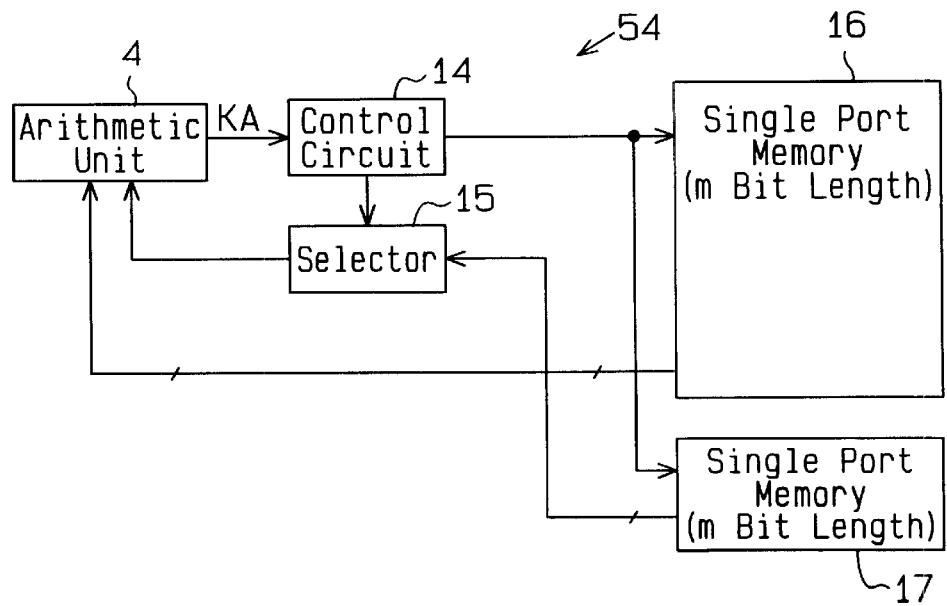
FIG. 6 is a schematic block diagram of a processor according to a fourth embodiment of the present invention.

FIG. 6 is a schematic block diagram of a processor 54 according to a fourth embodiment of the present invention. The processor 54 of the fourth embodiment employs first and second memories 16, 17, which are single-port memories, in lieu of the dual-port memory 11 of the third embodiment.

The first memory 16 functions as a lower order bit storage section and stores lower order bits of instruction codes. The second memory 17 functions as a higher order bit storage section and stores the higher order bits of the second memory 17. The remaining structure of the processor 54 is the same as that of the processor 53 of the third embodiment.

Like the processor 53, the processor 54 allows instruction codes to be read in every clock signal cycle and further increases the speed for transmitting instruction codes from the memory to the arithmetic unit 4.

It should be apparent to those skilled in the art that the present invention may be embodied in many other specific forms without departing from the spirit or scope of the invention. Particularly, it should be understood that the present invention may be embodied in the following forms.

The number of bits of the instruction codes is not limited to 17 and may be any other number.

Although each instruction code is divided into the higher order bit data of 1 bit and the lower order bit data of 16 bits, the instruction code may be divided into different number of bits.

The data width of the memory at each address is not limited to 16 bits and may be, for example, 8 bits or 24 bits.

The present examples and embodiments are to be considered as illustrative and not restrictive, and the invention is not to be limited to the details given herein, but may be modified within the scope and equivalence of the appended claims.

What is claimed is:

1. A processor for performing calculations based on a plurality of instruction codes, wherein each of the instruction codes includes a higher order bit and lower order bits, the number of lower order bits being an integer multiple of one byte, the processor comprising:

a memory for storing the instruction codes, wherein the memory includes a lower order bit storage section, for storing the lower order bits of each of the instruction codes, and a higher order bit storage section, for storing the higher order bit of each of the instruction codes;

an instruction code generation circuit connected to the memory, wherein the instruction code generation circuit receives a first address signal including data corresponding to an address of the memory, reads the lower order bits and the higher order bit of the instruction code located at the address corresponding to the first address signal, and generates the instruction code; and an arithmetic unit connected to the instruction code generation circuit to provide the first address signal to the instruction code generation circuit, to receive the instruction code generated by the instruction code generation circuit, and to perform a predetermined calculation.

2. The processor according to claim 1, wherein the higher order bit storage section stores the higher order bits of more than one of the instruction codes at the same address.

3. The processor according to claim 1, wherein the higher order bit storage section successively stores the higher order bits of more than one of the instruction codes without forming a vacant area.

4. The processor according to claim 1, wherein the instruction code generation circuit includes:
an address signal generation circuit connected to the arithmetic unit and the memory, wherein the address signal generation circuit generates a second address signal based on the first address signal to read the instruction codes from the memory, wherein the second address signal includes one of a higher order bit address signal for reading the higher order bits of the instruction codes from the higher order bit storage section and a lower order bit address signal for reading the lower order bits.

5. The processor according to claim 4, wherein the instruction code generation circuit includes:
a buffer register connected to the memory, wherein the buffer register stores the higher order bits of the instruction codes read from the memory based on the higher order bit address signal; and
a selector connected to the buffer register, wherein the selector selects the higher order bit corresponding to the lower order bits of a predetermined one of the instruction codes during a read cycle in which the lower order bits of the predetermined one of the instruction codes are read.

6. The processor according to claim 5, wherein the first address signal includes higher order bit address data, and the instruction code generation circuit rewrites the higher order bits of the instruction codes stored in the buffer register in accordance with the higher order bit address data of the first address signal.

7. The processor according to claim 6, wherein the instruction code generation circuit includes:
a higher order bit address holding circuit connected to the arithmetic unit, wherein the higher order bit address holding circuit stores the higher order bit address data of the first address signal;
a comparator connected to the higher order bit address holding circuit, wherein the comparator compares the higher order bit address data of the first address signal with the higher order bit address data stored in the higher order bit address holding circuit and selectively generates a matching signal and a non-matching signal, and wherein the address signal generation circuit includes:
an address signal switching circuit for providing the memory with the higher order bit address signal in response to the non-matching signal and for providing the memory with the lower order bit address signal in response to the matching signal, wherein the higher order bit address holding circuit is connected to the comparator and holds the higher order bit address data of the first address signal in response to the non-matching signal of the comparison signal, and the buffer register stores the higher order bit data output from the memory in response to the non-matching signal.

8. The processor according to claim 7, wherein the higher order bit storage section stores the higher order bits of more than one of the instruction codes at the same address.

9. The processor according to claim 7, wherein the higher order bit storage section successively stores the higher order bits of more than one of the instruction codes without forming a vacant area.

10. The processor according to claim 4, wherein the memory is a dual-port memory, which receives the higher order bit address signal and the lower order bit address signal in parallel.

11. The processor according to claim 10, wherein the higher order bit storage section successively stores the higher order bits of more than one of the instruction codes without forming a vacant area.

12. The processor according to claim 2, wherein the memory includes:
a first single port memory having the lower order bit storage section; and
a second single port memory having the higher order bit storage section, wherein the first single port memory and the second single port memory are respectively provided with the lower order bit address signal and the higher order bit address signal in a parallel manner.

13. The processor according to claim 12, wherein the higher order bit storage section successively stores the higher order bits of more than one of the instruction codes without forming a vacant area.

14. A processor for performing calculations based on a plurality of instruction codes, wherein each of the instruction codes includes a higher order bit and lower order bits, the number of lower order bits being an integer multiple of one byte, the processor comprising:
a memory for storing the instruction codes, wherein the memory includes a lower order bit storage section, for storing the lower order bits of each of the instruction codes, and a higher order bit storage section, for storing the higher order bits of more than one of the instruction codes at the same address.

15. The processor according to claim 14, wherein the higher order bit storage section successively stores the higher order bits of more than one of the instruction codes without forming a vacant area.

16. A information processing method for performing calculations based on a plurality of instruction codes, wherein each of the instruction codes includes a higher order bit and lower order bits, the number of lower order bits being an integer multiple of one byte, the method comprising the steps of:
storing the lower order bits of each of the instruction codes in a lower order bit storage section of a memory at a plurality of addresses;
storing the higher order bits of more than one of the instruction codes in a higher order bit storage section of the memory at a single address;
generating an instruction code in response to an address signal indicating an address of the memory by reading the lower order bits of a predetermined one of the instruction codes and the corresponding higher order bit in the same cycle; and
performing a calculation in accordance with the instruction code.

17. The information processing method according to claim 16, wherein the higher order bit storing step successively stores the higher order bits without forming a vacant area.

* * * * *